United States Patent

Ganske

[15] 3,641,279

[45] Feb. 8, 1972

[54] REVERSIBLE TAPE TRANSPORT WITH INTERLOCKED HEAD POSITION AND TAPE DIRECTION CONTROL

[72] Inventor: Kingston E. Ganske, Rough and Ready, Calif.

[73] Assignee: Arvin Industries, Inc., Columbus, Ind.

[22] Filed: Oct. 24, 1969

[21] Appl. No.: 869,085

[52] U.S. Cl. .............179/100.2MD, 179/100.2 CA, 274/4 D
[51] Int. Cl. .........................................................G11b 21/08
[58] Field of Search..........179/100.2 CA, 100.2 MI, 100.2 S; 274/4 D, 4 A, 11 D, 11 A

[56] References Cited

UNITED STATES PATENTS 3,487,175 12/1969 Newell.................................274/4 A

*Primary Examiner*—Bernard Konick
*Assistant Examiner*—Robert S. Tupper
*Attorney*—Marechal, Biebel, French & Bugg

[57] ABSTRACT

A reversible tape transport moves a record tape, such as magnetic recording tape, between two rolls which function alternately as supply and takeup Rolls. One or more magnetic recording and/or reading transducers scan longitudinally independent parallel tracks on the tape. Mechanism for locating the heads in alignment with desired tracks is interlocked with the drive for the transport such that the transducers will follow even numbered tracks in one direction, and odd numbered tracks in the other direction of movement of the tape, and the positioning mechanism is self-correcting in the event that it should get out of phase with this desired relationship.

5 Claims, 4 Drawing Figures

PATENTED FEB 8 1972

3,641,279

INVENTOR

KINGSTON E. GANSKE

BY

Marechal, Biebel, French & Bugg

ATTORNEYS

REVERSIBLE TAPE TRANSPORT WITH INTERLOCKED HEAD POSITION AND TAPE DIRECTION CONTROL

CROSS-REFERENCE TO RELATED APPLICATION

This application is related to U.S. Pat. application Ser. No. 758,061, filed Sept. 6, 1968 in the name of Don C. Barnett and Kingston E. Ganske, entitled REVERSIBLE TAPE TRANSPORT SYSTEM, now U.S. Pat. No. 3,550,985, and assigned to the same assignee as this application.

BACKGROUND OF THE INVENTION

This invention relates to improvements in a quick reversing tape transport system which is of particular utility in magnetic recording systems. A principal use of such systems, as contemplated herein, is in the recording and replay of television signals.

The general system to which the invention is directed embodies longitudinal recording on magnetic tape, in parallel tracks extending the length of the tape, with the tape being transported between rolls which function alternately as supply and takeup rolls. The system is capable of decelerating, reversing, and accelerating rapidly at the end of any track, therefore there is only an insignificant interruption in the signal recorded or replayed by the transducer.

During the change of direction, the head carrying one or more magnetic transducers is shifted to a new position to follow a different track as the direction of tape movement is reversed. In a typical system constructed in accordance with the invention dual transducers are mounted in predetermined spaced relation in the head, and are arranged to follow parallel tracks on which all signals necessary for video recording and playback are recorded. Thus the dual track in one direction handles the complete signal for either black and white or color television. In a typical arrangement, 10 dual tracks are employed on a ½-inch-wide magnetic recording tape. It is thus necessary to control the position of the head precisely, and to assure that the head is always in the correct position to follow the desired track.

SUMMARY OF THE INVENTION

In accordance with the invention the head carrying the transducers is positioned by a mechanism interlocked with the directional control of the transport. Assuming for purposes of explanation that the track positions are numbered one through 10 from the top edge of the tape, with the tape moving from left to right in the transport the head will position the transducers to follow the odd numbered tracks, and with the tape moving in the opposite direction they will follow the even numbered tracks. It should be understood that this relationship is merely by way of example, and it is not considered to be limiting, because it could be reversed, or the head could assume an initial position at either edge of the tape and move accordingly.

In the transport system, once the roll functioning as a supply has depleted to a predetermined minimum, a reversing signal occurs which causes the transport drive to decelerate rapidly, reverse direction, and accelerate in the opposite direction. At the moment of reversal, the head is moved to a new position by the head control mechanism. This mechanism includes an interlock circuit with the transport drive reversing controls, whereby the head will be moved to a new position only if its previous position is in accordance with the desired logic, i.e., following even numbered tracks in one direction and odd numbered tracks in the opposite direction. The logic control includes a switch operated through a cam mechanism positioned by the head locating apparatus, whereby power to advance the head locating drive is available only if the head has been following the correct "even" or "odd" track up until that time. If this is not the case, the head will not be advanced, and thus it will be brought into phase with the desired track following relationship.

Accordingly, the primary object of the invention is to provide a novel reversible tape transport system, capable of rapid turn around, wherein the head and transducers are rapidly shifted during turn around to follow new longitudinal tracks on the tape, and wherein the system includes an interlock arrangement assuring that the transducers follow only designated tracks corresponding to the direction of movement of the tape; and to provide such a system which employs a minimum of parts and makes maximum use of existing components in the transport and its controls, and which is thus simple, economical in construction, and relatively maintenance free.

Other objects and advantages of the invention will be apparent from the following description, the accompanying drawings and the appended claims.

DESCRIPTION OF THE PREFERRED EMBODIMENT

Figure 1:
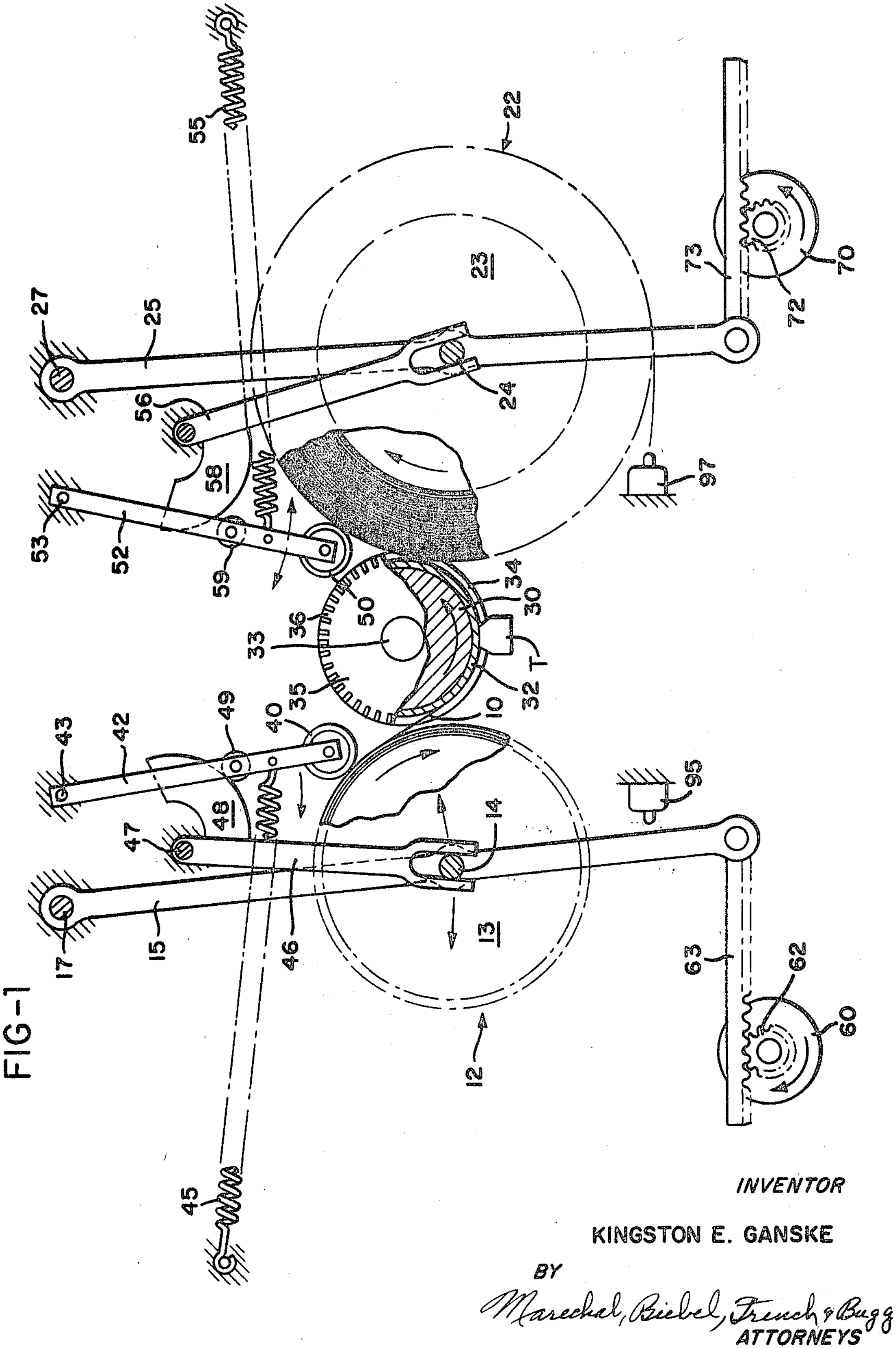
FIG. 1 is a somewhat schematic plan view of a tape transport system embodying features of the invention.

Referring to the drawing, which discloses a preferred embodiment of the invention, the tape 10, which may for example be magnetic recording tape, is shown coming from a supply roll 12 which is wound on a rotatable hub 13 supported on an axle 14. This axle is in turn carried on a swinging arm 15 that is pivotally mounted at 17 to the deck or base of the transport. The tape 10 passes from the supply roll to a takeup roll 22 where it is supported and wound on a rotatable hub 23 having an axle 24 mounted on the supporting arm 25. This arm is also pivotally mounted to the base or deck through the pivot hinge or pin 27.

Suitable one-way acting brakes (not shown) may be provided for the axles 14 and 24, to resist unwinding of the tape from the associated hub with a limited force. When the hub is rotated in the opposite direction the brake has no effect.

The tape is passed around the driving capstan 30 which has a resilient peripheral face 32, such as a rubber "tire," which engages the back surface of the tape and moves it from one roll to the other. The capstan is mounted on a drive shaft 33 which supports and rotates the capstan. The capstan incorporates a lower fixed or rigid guide flange 34 and an upper flange 35 which preferably is formed of somewhat flexible material and is sectioned adjacent its outer edge, as by a number of slots, into a plurality of spring sections 36 which tend to guide the upper edges of the tape downwardly, thus guiding the lower edge of the tape into contact with the flange 34. This arrangement assures proper alignment of the tape, as when passing it across one or more magnetic transducers T that are mounted to contact the tape at one side of the capstan, and also contributes to accurate placement of the tape on the takeup in the type of configuration shown.

Figures 2, 3:
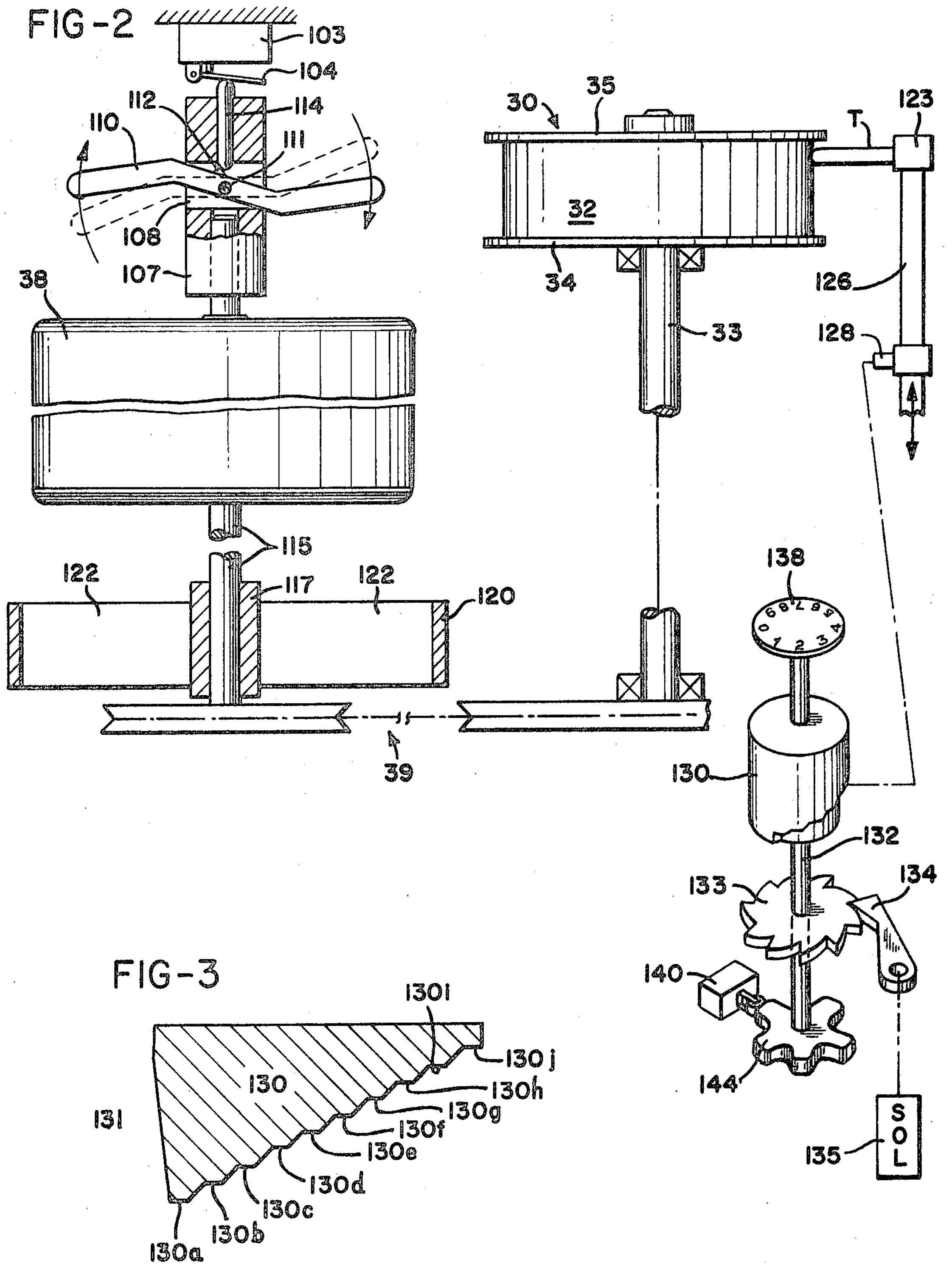
FIG. 2 is a somewhat schematic view showing the capstan, its synchronous motor drive including the resonant damper and speed control switch, and mechanism for shifting the transducer to different tracks.
FIG. 3 is a diagram of the cam controlling movement of the transducer head.

The capstan is driven by a synchronous motor 38 through a drive connection such as the belt and pulley drive 39 which is shown schematically in FIG. 2. In the two-way configuration shown, this motor is reversible.

Preferably a means is provided for holding the departure point of the supply roll 12 at a predetermined and constant spaced relation to the capstan, thereby causing the tape 10 to span a gap of about 0.010 inch from its point of departure from the supply roll to its point of initial engagement with the peripheral face of the capstan. A roller 40 is mounted for free rotation on the end of an arm 42 pivotally mounted at 43 to the base. A spring 45 is connected between a fixed point on the deck and the arm 42, and tends to pull the roller 40 into engagement with the supply roll, and thus push the roll away from the capstan, in the direction shown by the arrow in FIG. 1.

Movement of arm 42 and roller 40 is controlled through a following arm 46, which is pivoted to the base at 47, and which has a forked end engaged around the axle 14, or some other suitable point on the supply roll. The arm 46 carries a cam 48 which engages a roller 49 on the arm 42. The cam is contoured to the decrease in diameter of the roll 12 as successive convolutions of the tape are removed. The arm 46 and cam 48 thus hold the roller 40 engaging the outermost convolution of the tape on the supply roll at an essentially constant spacing from the face of the capstan.

Since the transport system preferably is intended to be bidirectional, the invention preferably includes a comparable control for the roll 22, since in the reverse direction of operation from that shown, it will in fact function as the supply roll. Thus, there is a second roller 50 carried on the end of an arm 52 pivotally mounted to the base at 53. The roller 50 rides in contact with the outermost convolution of tape on the roll 22, and is urged against the roll by a spring 55 connected between arm 52 and a fixed point on the base. A following arm 56 is pivoted to the base at 57 and carries a further control cam 58 which engages a roller follower 59 on arm 52.

This system tends of course to move the takeup roll 22 away from the capstan, however it may be desired that there be contact between the capstan and this roll in order to assure that the tape is placed smoothly and evenly on the takeup, and in some cases to rotate the takeup. Therefore, means are provided to override the effect of the rollers 40 and 50, respectively, depending upon which side is functioning as the takeup.

A torque motor 60 having an output pinion or gear 62 is connected to drive a rack 63, which is in turn connected to an extension of the supply roll-mounting arm 15. Similarly, a torque motor 70 has a pinion 72 meshing with a control rack 73 that is pivotally connected to an extension of mounting arm 25. During normal transport operation, depending upon the desired direction of rotation, one or the other of these torque motors exerts sufficient force to overcome the corresponding spring, and to urge the takeup roll into pressure contact with the capstan. In the condition shown torque motor 70 is thus energized and produces pressure contact between the takeup roll 22 and the capstan. Torque motor 60 at this time exerts no effective force on the capstan. However, in reverse direction operation, torque motor 60 overrides the roller 40 and its associated mechanism, while torque motor 70 becomes ineffective and the roller 50 maintains the desired constant spacing between the tape departure point of roll 22 and the capstan surface. During slow speed operation, as for threading, both motors 60 and 70 force the respective rolls into contact with the capstan.

Figure 4:
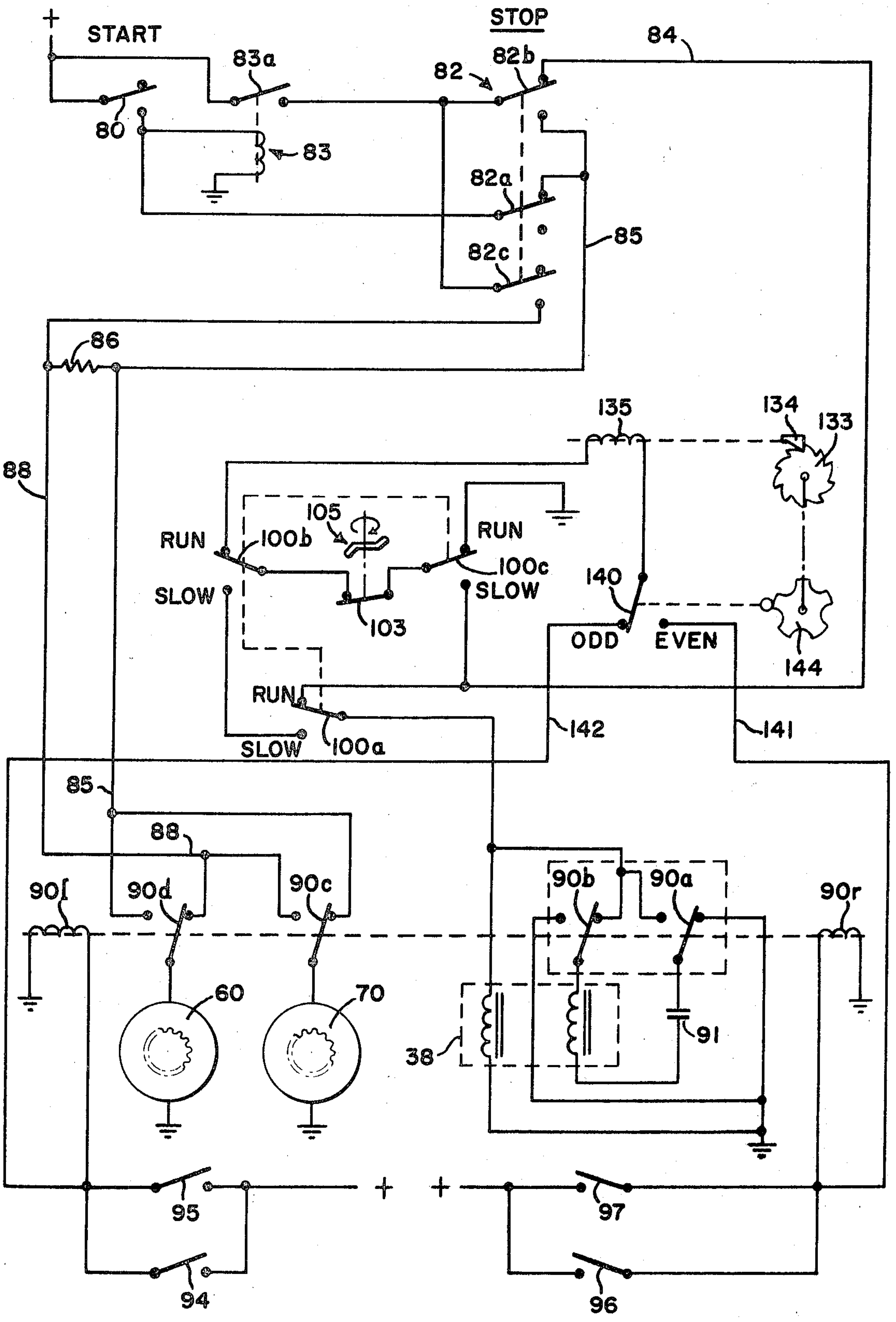
FIG. 4 is a schematic wiring diagram.

FIG. 4 is a diagram of a suitable AC control for the system. Power supply is indicated by the + legend, and the opposite terminals are shown grounded. A manually operated start switch 80 (shown open) is connected to one element **82*a* of a three-pole double throw manual stop switch 82 (shown in normal or start position). The start switch also provides power when closed to the coil of a time delay relay 83. The blade 83*a* of this relay completes a power supply circuit directly to a second blade element 82*b* of the stop switch, and this in turn applies power to the motor powerline 84**.

The third element **82*c* of the stop switch is connected to power supply through the relay blade or contact 83*a* and thus is controlled by it. In the normal position of the stop switch, the element 82*a* provides power (with the start switch closed) to a line 85 which forms a higher voltage supply to one or the other of the torque motors 60 and 70. Also, line 85 is arranged to receive power through the normally open contact of stop switch element 82*b* in the closed position of the stop switch, provided relay 83** is energized.

A dropping resistor 86 is connected from line 85 to a lower voltage supply line 88. This line can also become a higher voltage supply via its connection through the normally open contact of stop switch element **82*c*, also provided relay 83** is energized.

A direction control-latching relay 90 has four double pole contacts which control the reversing circuits for motor 38, and for the torque motors. Relay blades **90*a* and 90*b* are arranged to reverse the polarity of one of the motor windings, through capacitor 91. Relay blades 90*c* and 90*d* control the power supply to torque motors 70 and 60, respectively, from either the high-voltage line 85 or the normally low-voltage line 88. In the condition shown, motor 70 is connected to the higher voltage and thus holds takeup roll 22 against the capstan, and motor 38 is rotating the capstan 30 counterclockwise, as viewed in FIG. 1**.

To reverse, the coil 90L of the latching relay is energized, either through the manual reversing switch 94, or the automatically controlled switch 95 (see also FIG. 1) which senses movement of arm 15 corresponding to an empty supply roll 12. Changing direction back to that shown is accomplished by energized coil 90R of the latching relay, either through manual switch 96 or the automatic switch 97 which is closed by arm 25 when it reaches a position corresponding to an empty roll 22. Switches 95 and 97 are of the normally open type, and are closed only for the short time that the corresponding arm is in position to close one of them.

On stopping the system, moving stop switch 82 to its stop position, opposite to that shown, switch element **82*b* maintains power to the higher voltage line 85 through its normally open contact, and line 88 is changed to the higher voltage through the normally open contact of element 82*c*. Both torque motors thus receive higher voltage and hold both rolls 12 and 22** against the capstan. This prevents overrunning of the supply roll as the system decelerates.

The start and stop switches are mechanically interlocked by conventional means (not shown), such that actuating one moves the other to the opposite position. Thus start switch 80 will open when stop switch 82 is closed. This interrupts the power supply to the coil of the time delay relay. However a time delay device (not shown) holds the relay blade **83*a* closed for a certain period of time, sufficient to permit the system to stop before blade 83*a* opens and interrupts the power supply to torque motors 60 and 70. After the transport is stopped, both rollers 40 and 50 are free to move their associated rolls 12 and 22 away from the capstan, relieving its surface 32** from pressure contact with either roll.

During normal operation of the motor 38 at its synchronous speed the capstan is rotated at a corresponding predetermined speed which produces the desired constant velocity of the tape past the transducers T. In order to operate at a speed significantly lower than synchronous speed, such as in a recording device which provides for self-threading, there is a separate power and speed control for the synchronous motor.

The electrical power supply is connected through a normal running circuit including line 84 and the speed selector means 100. This means may be in the form of one set of contacts **100*a*** a double pole mechanical switch as illustrated, or may be in the form of any suitable electronic or electrical switching device as may be desired. The other sets of contacts are part of a track changing logic circuit as is explained hereafter.

The normal speed running circuit is as shown. Line 84 is connected through switch contacts **100*a* to motor 38 and its direction control circuits including switches 90*a* and 90*b*. The slow speed circuit incorporates switch contacts 100*a*, 100*b*, and 100*c*, together with a speed responsive switch means 103 which functions as a form of feedback control and interrupter responsive to motor speed. This is a series circuit from line 84 through switches 100*c*, 103, 100*b*, and 100*a* to the motor 38**.

The interrupter switch 103 conveniently is in the form of a normally closed switch which has an internal spring load tending to hold it in its closed position. The actuator arm or leaf 104 of this switch extends into contact with a governor mechanism 105, details of which are shown in FIG. 2.

The rotor shaft of the motor 38 has fastened to it a spindle 107 which is provided with a cross passage 108 receiving the flyweight arm 110, and this arm is pivotally mounted about a transverse axis through a cross pin 111. A cam 112 is formed on the arm 110 slightly to one side of the cross pin, and this cam engages an actuator pin or rod 114. The pin 114 is slidably mounted in the hub 107 along its axis of rotation and extends upward into engagement with the switch actuator arm 104.

The internal spring load of the switch 103 normally is sufficient to pushpin 114 downward against cam 112, thus at rest and at speeds below the desired low speed motor operation, the flyweight arm 110 is urged to the position shown in dotted lines in FIG. 2. The positions of the pin and cam are shown in the "at rest" position in full lines.

As the motor reaches a predetermined speed at which the flyweight 110 will rotate about its cross pin, the flyweight will move to the position shown in full lines in FIG. 2, since the ends of the flyweight arm will tend to assume the largest radius that they can attain. This causes cam 112 to push upward on the pin 114, opening the switch 103 and thus interrupting the low speed power supply to the motor. As the motor slows, for example due to the load upon it, the flyweight arm will return to its dotted line position, and switch 103 will again close. By appropriate selection of the length and mass of the flyweight arm, it is possible to have the flyweight move between these two positions over a relatively small range of speed difference. This permits the interrupter in the low speed circuit to open and close again at speeds which are fairly close to each other, for example in the order of 20 r.p.m. difference, thus it is possible to operate the synchronous motor at this lower speed, which is essentially the actuating speed of the flyweight arm 110, without noticeable hunting.

FIG. 2 shows the precision motor drive system incorporating the synchronous motor 38 receiving power from a suitable AC supply. This supply is usually 60 cycle AC, although it should be recognized that in some locations either 25 cycle or 50 cycle AC is used commercially. The motor shaft 115 is connected to the pulley, and it is this shaft which has been found to exhibit a vibratory output torque variation which is related to the frequency of the AC supply. With a 60 cycle AC power supply the output torque variation has been observed at 120 cycles per second, generally according to the regularly changing polarity of the alternating current power input.

A resonant damping device is provided on shaft 115 in the form of a hub member 117 fixed to the shaft. Surrounding this shaft, coaxial with the hub, is a ring 120 which is connected to the hub 117 by a plurality of compliant spoke members 122. These spoke members are preferably selected from flat strips of spring steel having sufficient resilience to cause the hub-spoke-ring system to exhibit a resonant vibration characteristic at a frequency of approximately double the frequency of the AC power supply, for example 120 cycles per second.

The transducers T are carried in a head 125 mounted on a supporting post 126 for movement transversely of the path of movement of the tape 10 which is carried past the head on capstan 30. A track width is a relatively small fraction of the total width of the tape, for example in a typical embodiment the tape 10 has a width of one-half inch, and each track width is 0.017 inch. Thus, the track or tracks followed by the head occupy relatively small and spaced apart segments of the width of the tape, and the head 125 can be moved to different positions with respect to the tape in order to follow different tracks as the tape is transported in one direction or the other between the supply and takeup.

For purposes of moving the heads simultaneously, a selector device is provided in the form of the supporting rod or post 126 cooperating with a cam follower 128, and the post is mounted for vertical movement, for example in a suitable tubular holder or the like (not shown). A light spring is adapted to press upward against the post 126 urging it to its upper limit position.

The cam follower 128 engages a barrel-type cam 130 which is mounted adjacent the post 126, being secured to a rotatable shaft 132 which has fixed to it a ratchet wheel 133. The pawl 134, which may be controlled for example by a solenoid 135, is arranged to rotate the ratchet wheel and hence the cam 130, by a predetermined angular amount. Preferably, a conventional secondary pawl (not shown) is provided to hold the ratchet wheel in any given position.

FIG. 3 is a graphic view of the control surface of cam 130, illustrating ten steps **130*a*–130*j*, any one of which may be engaged with the follower 128 to locate the post and the heads in a corresponding vertical position. As will be obvious from FIG. 2, a counterclockwise rotation of cam 130, as viewed from above, will provide a cam action on the follower 128 tending to push it downward in a step-by-step fashion. After the final or lowermost step, there is a return ramp 131 which will guide the follower back to its upper most position 130*a* in response to urging of the spring. An indicator 138 is carried by shaft 132** for observance of the position of the head.

In the running circuit switch 103 has no effect, hence it can be employed in the track position control logic at such times. Thus, in the "run" position switches **100*c*, 103, and 100*b* complete a circuit from ground to the coil of solenoid 135, provided the motor has slowed sufficiently to close switch 103. Power can then be supplied to solenoid 135 through a track logic switch 140 which has its common terminal or pole connected to the solenoid coil. This switch alternates between two contacts connected to power lines 141 and 142, under the control of a cam 144 which is mounted to rotate with the shaft 132** of the track selector mechanism.

Cam 144 has a lobe corresponding to every other tooth of ratchet wheel 133, hence switch 140 will assume one position for the even numbered tracks on the tape, and the other position for odd numbered tracks. For purposes of illustration the contact connection of switch 140 to line 141 is assumed to be the "odd" track circuit. Line 141 leads through switch 97 to the power supply. Similarly line 142 extends from the other contact of switch 140 to switch 95, and through it to the power supply, forming the "even" track circuit.

Assuming that a full roll of tape is placed as the supply roll 12, and the head locating mechanism is on track one, with switch 100 in the "run" position and the transport operating, switch 103 will be open, switch 140 in the "odd" position shown, and switch 97 will be open. When the end of the track approaches, arm 15 will close switch 95 and energize coil 90L of the latching relay. This reverses motor 38 and also reverses the power connections to the torque motors 60 and 70.

Motor 38 is dynamically braked, thus it and the capstan decelerate rapidly and switch 103 closes. This completes the track changing circuit from switch 95 through line 142, switch 140, the solenoid coil, switches **100*b* and 100*c* and switch 103. A similar circuit will be completed in the opposite direction when the tape on roll 22 is depleted and the end of the second track approaches. This time the circuit includes switch 97 and line 141, with switch 140** in its "even" position.

Since actuation of switches 95 and 97 will immediately energize the appropriate coil 90L or 90R of the latching relay, the relay blades **90*c* and 90*d* will shift to place a higher voltage on whichever torque motor 60 or 70 was previously energized through the lower voltage line 88**. The roll functioning as a supply thus is immediately moved into contact with the capstan as it decelerates, preventing the supply from overrunning. The roll acting as a takeup will begin to move away from the capstan, as its torque motor now is connected to the lower voltage supply. However, the takeup has been driven by the capstan up to that time, hence its inertia will keep the tape taut as it leaves the slowing capstan.

The motor 38 decelerates rapidly, since reversing polarity of one of the windings effectively causes dynamic braking of the motor and the rotating parts have a relatively low mass. The motor quickly reaches zero velocity and starts accelerating in the opposite direction. Due to the low inertia of the system, this change in direction is rapid, only a fraction of a second being required to change from full speed in one direction to the other. In this time solenoid 135 is energized and the head is shifted to another track, hence there is only a short interruption in the output (or input) signals from the tape. Because the track changing circuit is finally completed by switch 103, the head remains following the previous track during deceleration, thus recording or reading of a signal from that track continues up to the moment of reversal. By the time the head is then shifted, the tape is accelerating in the opposite direction and recording or reading resumes immediately on the next track, with a minimum of interruption, and without reading or recording over the same track in opposite directions. This is a particular advantage in longitudinal recording of programs such as video signals, where minimum interruption is desired.

The switch 140 and its control cam 144 thus cooperate with the remainder of the head changing circuits and mechanism to form a logic and interlock circuit which assures that the head shifting mechanism remains in phase with the direction of movement of the tape. Accidental shifting of the head, for example by a spurious signal after the regular shifting signal, is avoided since power cannot be applied to the solenoid 135. Furthermore the head cannot be shifted across the tape while operating at running speed, since switch 103 is then open. However, the head shifting controls will follow faithfully if the manual reversing switches 94 and 96 are closed in alternate sequence, thus providing a convenient way to select a desired track without losing the correct phase relation between tape transport direction and track location of the head.

While the form of apparatus herein described constitutes a preferred embodiment of the invention, it is to be understood that the invention is not limited to this precise form of apparatus, and that changes may be made therein without departing from the scope of the invention.

What is claimed is:

1. In a tape transport system comprising
- a pair of rolls providing a supply and a takeup for flexible tape,
- a rotatable capstan arranged to engage the tape and to drive the tape from one of said rolls to the other,
- a reversible drive motor having an output shaft coupled to rotate said capstan,
- controls constructed and arranged to reverse said motor rapidly,
- a transducer mounted to scan a selected longitudinal track of a plurality of such tracks on the tape,
- selector means operative to locate said transducer to follow a different track at each direction change of the system,
- the improvement comprising interlock means responsive to the location of said transducer and controlling the operation of said selector means to maintain correct phase between the direction of tape movement and the track location of said transducers.

2. A tape transport system as defined in claim 1, wherein said interlock means includes a multiposition switch controlling the application of power to said selector means from different sources in said reversing controls, and a cam movable with said transducer and operative on said switch to change the switch position according to the track location of said transducer.

3. In a tape transport system comprising
- a pair of rolls providing a supply and a takeup for flexible tape,
- a rotatable capstan arranged to engage the tape over a section of its peripheral face and to drive the tape from one of said rolls to the other,
- means mounting said rolls for movement toward and away from said capstan in compliance with the change in diameter due to buildup of tape thereon,
- a head and at least one transducer mounted therein to scan a track along said tape which track has a width only a fraction of the tape width,
- means supporting said head for selective movement to different positions across the width of said tape,
- a selector device controlling the position of said supporting means,
- a reversible drive motor coupled to rotate said capstan,
- a speed-sensing switch means driven by said motor, and
- controls constructed and arranged to reverse said motor rapidly when tape on the supply roll is depleted to a predetermined minimum and to actuate said selector device to initiate changing of said head to a different track location;
- the improvement comprising an operating connection from said speed-sensing switch means to said selector device to allow initiating a change in position of said head when said motor has slowed below a predetermined speed, and
- a track logic switch means responsive to the position of said head supporting means and connected to prevent actuation of said selector device unless the position of said head is correctly phased with the direction of movement of the tape.

4. A tape transport system as defined in claim 3, wherein said selector device includes a movable head control cam operable to locate said head supporting means,
- rotary actuatory means including a driving solenoid for changing the position of said head control cam,
- a logic control cam movable with said head control cam and arranged to operate said track logic switch means,
- said connection to said selector device including a series circuit incorporating said solenoid, said speed-sensing switch means, and said track logic switch means for actuating said solenoid only when said motor is below the predetermined speed and the head position is correctly phased with the direction of tape movement.

5. A tape transport system as defined in claim 3, including a separate slow speed circuit for said motor incorporating said speed-sensing switch means, and speed control switch means connected and arranged to transfer said speed-sensing switch means between said series circuit and said slow speed circuit.

* * * * *

PO-1050
(5/69)

UNITED STATES PATENT OFFICE

CERTIFICATE OF CORRECTION

Patent No. 3,641,279 Dated February 8, 1972

Inventor(s) Kingston E. Ganske

It is certified that error appears in the above-identified patent and that said Letters Patent are hereby corrected as shown below:

Claims 1, 3, 4 and 5 should be rewritten as follows:

-1-

In a tape transport system comprising
a pair of rolls providing a supply and a take-up for flexible tape,
a rotatable capstan arranged to engage the tape and to drive the tape from one of said rolls to the other,
means mounting said rolls for movement toward and away from said capstan in compliance with the change in diameter due to build-up of tape thereon,
a transducer mounted to scan a selected longitudinal track of a plurality of such tracks on the tape,
selector means operative to locate said transducer to follow a different track at each direction change of the system,
a reversible drive motor having an output shaft coupled to rotate said capstan,
control means to reverse said motor rapidly when tape on the supply roll is depleted to a predetermined minimum and to actuate said selector means to initiate changing of the transducer to a different track location,
the improvement comprising interlock means responsive to the location of said transducer and the direction of the tape movement to control the operation of said selector means to prevent actuation of said selector means unless the position of said transducer is correctly phased with the direction of movement of the tape.

-3-

In a tape transport system comprising a pair of rolls providing a supply and a take-up for flexible tape, a rotatable capstan arranged to engage the tape over a section of its peripheral face and to drive the tape from one of said rolls to the other, means mounting said rolls for movement toward and away from said capstan in compliance with the change in diameter due to build-up of tape thereon, a head and at least one transducer mounted therein to scan a track along said tape which track has a width only a fraction of the tape width, means supporting said head for selective movement to different positions across the width of said tape, a selector means controlling the position of said supporting means, a reversible drive motor coupled to rotate said capstan, a speed sensing switch means driven by said motor, and control means to reverse said motor rapidly when tape on the supply roll is depleted to a predetermined minimum and to actuate said selector means to initiate changing of said head to a different track location;

the improvement comprising an operating connection from said speed sensing switch means to said selector means to initiate a change in position of said head when said motor has slowed below a predetermined speed, and a track logic switch means responsive to the position of said head supporting means and the direction of movement of the tape to prevent actuation of said selector means unless the position of said head is correctly phased with the direction of movement of the tape.

-4-

A tape transport system as defined in claim 3, wherein said selector means includes a movable head control cam operable to locate said head supporting means, rotary actuatory means including a driving solenoid for changing the position of said head control cam, a logic control cam movable with said head control cam and connected to operate said track logic switch means, and a series connected control circuit for said selector means incorporating said solenoid, said speed sensing switch means, and said track logic switch means for actuating said solenoid only when said motor is below the predetermined speed and the head position is correctly phased with the direction of tape movement.

-5-

A tape transport system as defined in claim 3, including a separate slow speed circuit for said motor incorporating said speed sensing switch means, and speed control switch means to transfer said speed sensing switch means between said series circuit and said slow speed circuit.

Signed and sealed this 2nd day of January 1973.

(SEAL)
Attest:

EDWARD M.FLETCHER,JR.
Attesting Officer

ROBERT GOTTSCHALK
Commissioner of Patents